(12) United States Patent
Hui et al.

(10) Patent No.: US 11,146,356 B2
(45) Date of Patent: Oct. 12, 2021

(54) ADAPTIVE CRC LENGTH FOR BEAM SWEEPING

(71) Applicant: Telefonaktiebolaget LM Ericsson (publ), Stockholm (SE)

(72) Inventors: Dennis Hui, Sunnyvale, CA (US); Yufei Blankenship, Kildeer, IL (US); Anders Wesslén, Staffanstorp (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 111 days.

(21) Appl. No.: 16/612,803

(22) PCT Filed: May 11, 2018

(86) PCT No.: PCT/IB2018/053316
§ 371 (c)(1),
(2) Date: Nov. 12, 2019

(87) PCT Pub. No.: WO2018/207155
PCT Pub. Date: Nov. 15, 2018

(65) Prior Publication Data
US 2020/0067640 A1 Feb. 27, 2020

Related U.S. Application Data (60) Provisional application No. 62/505,715, filed on May 12, 2017.

(51) Int. Cl.
*H04L 1/00* (2006.01)
*H04B 7/06* (2006.01)
(Continued)

(52) U.S. Cl.
CPC ......... *H04L 1/0061* (2013.01); *H04B 7/0695* (2013.01); *H04L 1/0041* (2013.01);
(Continued)

(58) Field of Classification Search
CPC ... H04L 1/0041; H04L 1/0047; H04L 1/0057; H04L 1/0061; H04L 1/0064; H04L 1/0072; H04L 1/06; H04B 7/0695
See application file for complete search history.

(56) References Cited

U.S. PATENT DOCUMENTS

| | | | |
|---|---|---|---|
| 6,560,746 B1 * | 5/2003 | Morsberger | H03M 13/6575 714/781 |
| 2009/0077446 A1 * | 3/2009 | Seo | H04L 1/0061 714/755 |

(Continued)

OTHER PUBLICATIONS

3GPP TSG RAN WG1 Meeting #89; Hangzhou, China; Source: Huawei, HiSilicon; Title: Discussion on SS block time index indication (R1-1708166)—May 15-19, 2017.

(Continued)

*Primary Examiner* — Chi H Pham
*Assistant Examiner* — Vladislav Y Agureyev
(74) *Attorney, Agent, or Firm* — Baker Botts, LLP (57) ABSTRACT

According to some embodiments, a method for use in a wireless transmitter of adaptive cyclic redundancy check (CRC) length selection comprises: obtaining a system parameter related to a number of beam sweeps used by the wireless transmitter for transmitting a wireless signal; selecting a CRC length based on the obtained system parameter; selecting a CRC polynomial of the selected length; generating CRC bits from time-dependent or time-independent information bits using the CRC polynomial; concatenating the generated CRC bits with the time-dependent or time-independent information bits; encoding the concatenated bits; and transmitting the encoded bits to a wireless receiver. The system parameter may comprise: a carrier frequency; a number of transmit antenna elements; a number of receive antenna elements; a transmitter antenna azimuth configuration; a transmitter antenna elevation configuration; an (Continued)

antenna polarization type; a beam scanning algorithm; and a cell type.

11 Claims, 9 Drawing Sheets

(51) Int. Cl.
    *H04L 1/06*     (2006.01)
    *H04W 72/04*     (2009.01)

(52) U.S. Cl.
    CPC .......... *H04L 1/0057* (2013.01); *H04L 1/0064* (2013.01); *H04L 1/06* (2013.01); *H04W 72/046* (2013.01)

(56) References Cited

U.S. PATENT DOCUMENTS

| | | | | |
|---|---|---|---|---|
| 2009/0119570 A1* | 5/2009 | Eder | ..................... | H04L 1/0054 |
| | | | | 714/792 |
| 2009/0175387 A1* | 7/2009 | Park | ..................... | H04L 1/0054 |
| | | | | 375/340 |
| 2009/0177951 A1* | 7/2009 | Lee | ................... | H03M 13/3994 |
| | | | | 714/799 |
| 2011/0029838 A1* | 2/2011 | Shinagawa | ........... | H03M 13/35 |
| | | | | 714/758 |
| 2017/0311276 A1* | 10/2017 | Tsai | ...................... | H04W 48/16 |
| 2018/0007398 A1* | 1/2018 | Bleidt | ................ | H04N 21/8106 |
| 2018/0123849 A1* | 5/2018 | Si | .......................... | H04J 11/0073 |
| 2018/0323809 A1* | 11/2018 | Lin | ....................... | H04L 1/0045 |
| 2018/0323810 A1* | 11/2018 | Sarkis | ................... | H03M 13/13 |
| 2019/0238270 A1* | 8/2019 | Pan | .................... | H04W 74/0833 |
| 2020/0059810 A1* | 2/2020 | Harada | ............. | H04W 56/0015 |
| 2020/0119800 A1* | 4/2020 | Rune | ..................... | H04W 76/28 |

OTHER PUBLICATIONS

PCT International Search Report for International application No. PCT/IB2018/053316—dated Oct. 26, 2018.

PCT Written Opinion of the International Searching Authority for International application No. PCT/IB2018/053316—dated Oct. 26, 2018.

* cited by examiner

ADAPTIVE CRC LENGTH FOR BEAM SWEEPING

PRIORITY

This nonprovisional application is a U.S. National Stage Filing under 35 § 371 of International Patent Application Serial No. PCT/IB2018/053316 filed May 11, 3018 and entitled "Adaptive CRC Length for Beam Sweeping" which claims priority to U.S. Provisional Patent Application No. 62/505,715 filed May 12, 2017 both of which are hereby incorporated by reference in their entirety.

TECHNICAL FIELD

Particular embodiments are directed to wireless communications and, more particularly, to adaptive cyclic redundancy check (CRC) length for beam sweeping.

INTRODUCTION

Fifth generation (5G) New Radio (NR) communication systems can operate with carrier frequencies ranging from hundreds of MHz to hundreds of GHz. When operating in the very high frequency band, such as the millimeter-wave (mmW) bands (~30-300 GHz), radio signals attenuate much more quickly with distance than those in lower frequency band (e.g., 1-3 GHz). Thus, to broadcast system information to user equipment (UE) over the same intended coverage area, beamforming is typically used to achieve power gain to compensate for path loss in the high frequencies.

Because the signal coverage of each beam can be quite narrow when many antennas are used to form the beam, the system information is broadcast or transmitted at a different beam direction one beam at a time. The process of transmitting signals carrying the same information using beams with different (azimuth and/or elevation) directions one at a time is commonly referred to as beam sweeping.

Because typically only one of the many beams carrying the same system information can reach a particular receiver with good signal strength, the receiver does not know the location of the received beam in the overall radio frame structure. To enable the receiver to determine the start and the end of a periodic radio frame, a time index is often included when broadcasting the system information through beam sweeping. An example is illustrated in FIG. 1.

Figure 1:
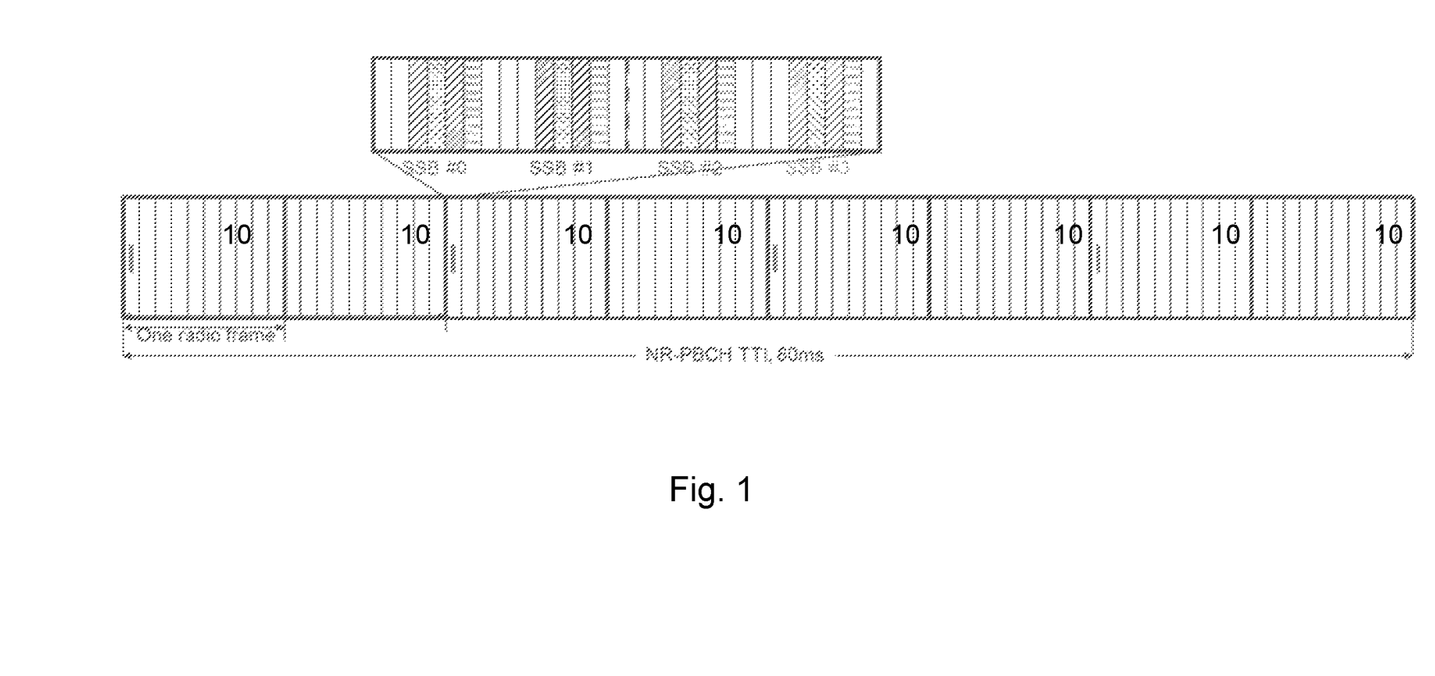
FIG. 1 illustrates an example of a synchronization signal structure with system information broadcasted with beam sweeping.

FIG. 1 illustrates an example of system information broadcast together with reference synchronization signals (SS) using beam sweeping. The horizontal axis represents the time domain.

The illustrated example includes eight radio frames 10. The system information is carried by a physical channel called New Radio Physical Broadcast Channel (NR-PBCH), which is transmitted in multiple synchronization blocks (SSB), each beamformed in a different direction. The SSBs are repeated within a certain NR-PBCH transmission time period (TTI, 80 ms in this example). Within a NR-PBCH transmission time interval (TTI), the system information carried by the NR-PBCH MIB in each SSB is the same. However, each NR-PBCH also carries a time index for the receiver to determine the radio frame boundaries. NR-PBCH may be encoded using polar codes.

For example, if a receiver receives and successfully decodes a time index that indicates the SSB block number to be 1, then the receiver knows that it is in the section of the radio frame labeled SSB #1 in FIG. 1. The receiver can then derive where the radio frame boundaries are with respect to the reception time instance of the SSB.

The correct decoding of the time-index (as well as other system information) is important in determining the radio frame boundaries (which affects all subsequent communications between the network and the UE). Thus, it is important to protect the time-index, possibly along with other system information, with a cyclic redundancy check (CRC) code of a predefined length so that any incorrect decoding of the time index can be detected.

In a general framework, in a communication system, some information that needs to be sent periodically often consists of a time-independent portion (e.g., system information) and a time-dependent portion (e.g., time index). These two types of information are sometimes coded together using a single channel code with embedded CRC to ensure certain error detection capability. Either the time-dependent portion or the time-independent portion, or both, may be protected by CRC. Those of skill in the art will understand that the embodiments described herein can apply more generally to such a mixture of time-dependent and time-independent information that is coded using a common channel code.

Polar codes are used as the channel coding scheme for control channels in 5G NR and may be the channel coding scheme for NR-PBCH to broadcast system information from a base station to a UE. Polar codes, proposed by Arikan (E. Arikan, "Channel Polarization: A Method for Constructing Capacity-Achieving Codes for Symmetric Binary-Input Memoryless Channels," IEEE Transactions on Information Theory, vol. 55, pp. 3051-3073, July 2009), are a class of constructive coding schemes that achieve the symmetric capacity of the binary-input discrete memoryless channels under a low-complexity successive cancellation (SC) decoder. However, the finite-length performance of polar codes under SC is not competitive compared to other modern channel coding schemes such as low-density parity-check (LDPC) codes and Turbo codes. A SC list (SCL) decoder is proposed in I. Tal and A. Vardy, "List Decoding of polar codes," in Proceedings of IEEE Symp. Inf. Theory, pp. 1-5, 2011, which approaches the performance of optimal maximum-likelihood (ML) decoder. By concatenating a simple CRC coding, the performance of concatenated polar codes is competitive with that of well-optimized LDPC and Turbo codes. As a result, polar codes may be used for 5G wireless communication systems.

Polar coding transforms a pair of identical binary-input channels into two distinct channels of different qualities, one better and one worse than the original binary-input channel. Repeating such a pair-wise polarizing operation on a set of $2^M$ independent uses of a binary-input channel results in a set of $2^M$ "bit-channels" of varying qualities. Some of the bit channels are nearly perfect (i.e., error free), while the rest are nearly useless (i.e., totally noisy). Polar coding uses the nearly perfect channel to transmit data to the receiver while setting the input to the useless channels to have fixed or frozen values (e.g., 0) known to the receiver. For this reason, the input bits to the nearly useless and the nearly perfect channel are commonly referred to as frozen bits and non-frozen (or information) bits, respectively.

Figure 2:
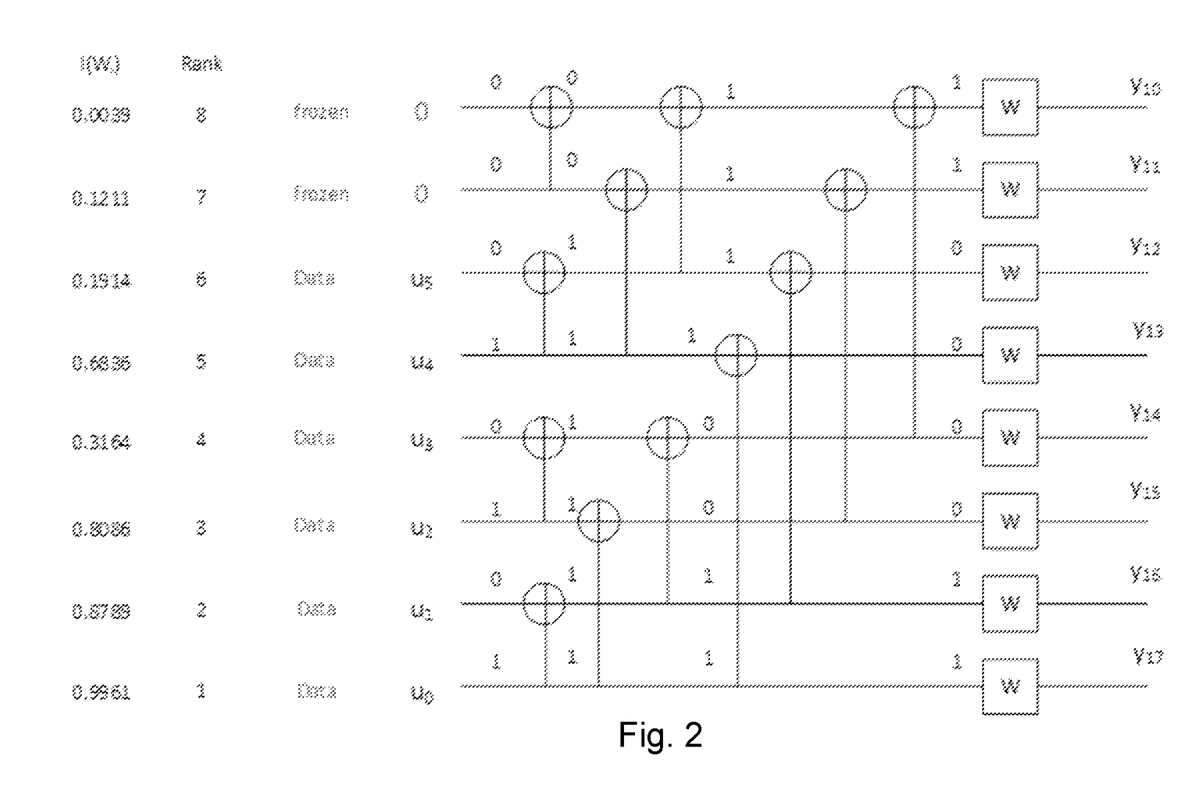
FIG. 2 illustrates an example of a polar code structure with N=8.

Only the non-frozen bits are used to carry data in a polar code. Loading the data into the proper information bit locations has a direct impact on the performance of a polar code. An illustration of the structure of a length-8 polar code is illustrated in FIG. 2.

Figure 3:
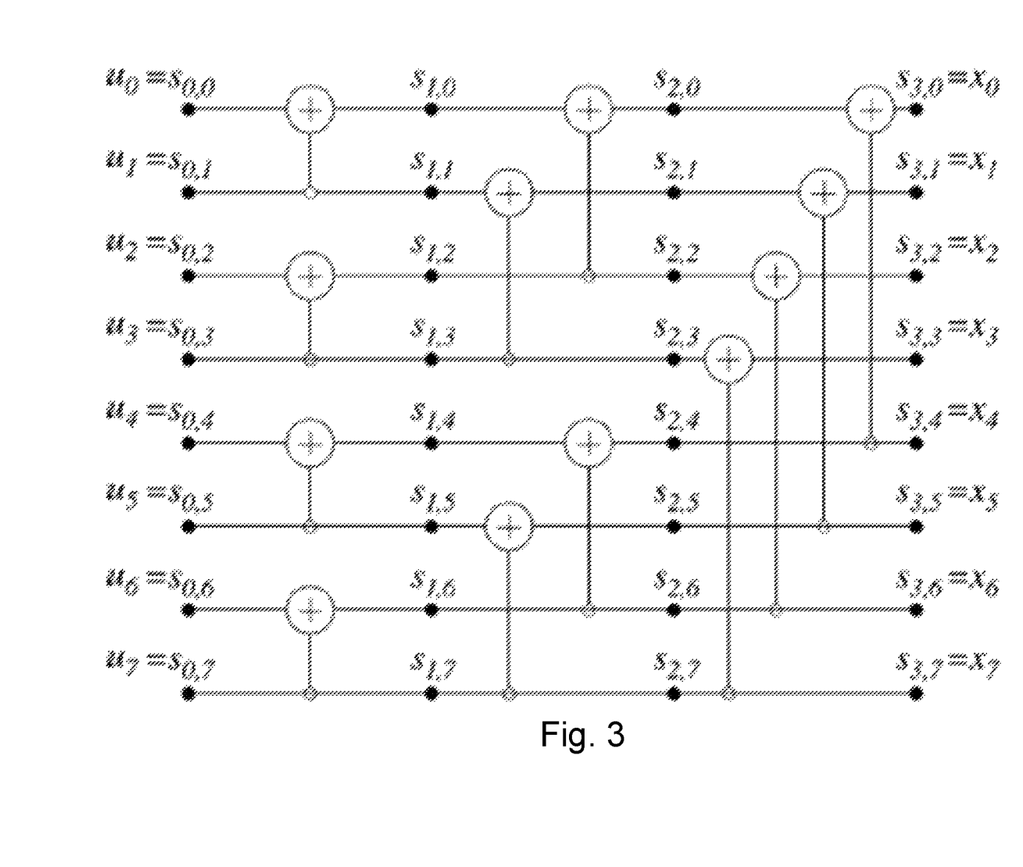
FIG. 3 illustrates an example polar code encoder with N=8.

FIG. 3 illustrates the labeling of the intermediate information bits $s_{l,i}$, where $l \in \{0, 1, \ldots, n\}$ and $i \in \{0, 1, \ldots,$ N-1} during polar encoding with N=8. The intermediate information bits are related by the following equation: $s_{l+1,i}=s_{l,i}\oplus s_{l,i+2^l}$, for $l\in\{0, 1, \ldots, n-1\}$ and $i\in\{0, 1, \ldots, N-1\}$, with $s_{0,i}=u_i$ be the information bits, and $s_{n,i}=x_i$ be the code bits, for $i\in\{0, 1, \ldots, N-1\}$.

A particular problem is that 5G New Radio (NR) communication systems can operate with carrier frequencies over a wide range. As the carrier frequency increases, however, the path loss also increases. To close the link budget, beamforming with a large antenna array may be used. Because the width of a beam is typically inversely proportional to the number of antennas, which governs the aperture of the antenna array, the angular coverage of each beam is increasingly limited as the carrier frequency increases. Thus, the number of beam sweeps used to cover the same geographical area increases. Each beam sweep carries a unique time-index for the receiver to determine the radio frame boundaries. Receivers should be able to correctly decode the time index efficiently.

In many methods of carrying the time index in each beam sweep, the time index can only be detected efficiently with the help of a CRC, although the original purpose of adding the CRC is only to detect any potential errors there may be in the detected time-index and data. The most efficient way of decoding the time index for these methods of transmission is to hypothesize each possible value of the time index, decode the data assuming the hypothesized value is correct, and then check the CRC to see if any potential error is detected. Because the number of possible values of the time index is no less than the number of beam sweeps, a large number of CRC checks are performed over each received block of log-likelihood ratios (LLRs) when there is a lot of beam sweeps. As a result, the false detection rate or false alarm rate (FAR) increases.

SUMMARY

The embodiments described herein adaptively select the length of cyclic redundancy check (CRC) based on the number of beam sweeps, the antenna configuration (e.g., the number of antenna elements or the type of antennas), the operating carrier frequency, or any system parameters that may be used to determine the number of beam sweeps. At the transmitter, the system parameter is often readily available before the transmission of the radio signal. For example, for the transmitter to be able to transmit the signal, it must know which carrier frequency should be used and how many antennas are used.

At the receiver, in some cases, the system parameters are transmitted by the network to the user equipment (UE) before the UE attempts to access the periodically transmitted broadcast information. For example, the number of beam sweeps may be communicated along with a synchronization signal (PSS/SSS) transmitted for initial time and frequency synchronization. In other cases, the UE should already be aware of the number of beam sweeps before accessing broadcast information. For example, for the receiver to be able to receive the signal, the receiver must have already known the carrier frequency, which may then be used to determine, possibly through look-up of a predefined table, the necessary length of CRC. In yet other cases, the number of beam sweeps may be blindly detected without any a priori knowledge of a system parameter from a predetermined set of possible numbers of beam sweeps.

According to some embodiments, a method for use in a wireless transmitter of adaptive CRC length selection comprises: obtaining a system parameter related to a number of beam sweeps, $L_{test}$, used by the wireless transmitter for transmitting a wireless signal; selecting a CRC length based on the obtained system parameter; selecting a CRC polynomial of the selected length; generating CRC bits from time-dependent or time-independent information bits using the selected CRC polynomial; concatenating the generated CRC bits with the time-dependent or time-independent information bits; encoding the concatenated bits; and transmitting the encoded bits to a wireless receiver.

In particular embodiments, the obtained system parameter comprises at least one of: a carrier frequency; a number of transmit antenna elements; a number of receive antenna elements; a transmitter antenna azimuth configuration; a transmitter antenna elevation configuration; an antenna polarization type; a beam scanning algorithm; and a cell type.

In particular embodiments, time-independent information comprises system information and the time-dependent information comprises a time index. The encoding may comprise polar encoding.

In particular embodiments, a number of CRC bits used for a single beam sweep is represented by $L_{crc0}$, and the selected CRC length is $L_{crc0}+\log_2(L_{test})$. For example, $L_{crc0}$ may be 16, Lest may be 4, and the selected CRC length may be 18. $L_{crc0}$ may be 16, Lest may be 8, and the selected CRC length may be 19. $L_{crc0}$ may be 16, $L_{test}$ may be 64, and the selected CRC length may be 22.

In particular embodiments, the wireless transmitter comprises a network node.

According to some embodiments, wireless transmitter is capable of adaptive CRC length selection. The wireless transmitter comprises processing circuitry operable to: obtain a system parameter related to a number of beam sweeps, $L_{test}$, used by the wireless transmitter for transmitting a wireless signal; select a CRC length based on the obtained system parameter; select a CRC polynomial of the selected length; generate CRC bits from time-dependent or time-independent information bits using the selected CRC polynomial; concatenate the generated CRC bits with the time-dependent or time-independent information bits; encode the concatenated bits; and transmit the encoded bits to a wireless receiver.

According to some embodiments, a method for use in a wireless receiver of adaptive CRC length selection comprises: receiving encoded bits from a wireless transmitter; determining a number of hypothesis testings, $L_{test}$, for hypothesis-testing-based decoding of the received encoded bits; selecting a length of CRC based on the number of hypothesis testings; selecting a CRC polynomial of the selected length; performing hypothesis-testing-based decoding using the selected CRC polynomial and the selected length; and determining the best hypothesis that passes the CRC based on a path metric from the decoding.

In particular embodiments, determining the number of hypothesis testings comprises obtaining a system parameter related to a number of beam sweeps that the wireless transmitter uses to transmit a wireless signal. The obtained system parameter may comprise at least one of: a carrier frequency; a number of transmit antenna elements; a number of receive antenna elements; a transmitter antenna azimuth configuration; a transmitter antenna elevation configuration; an antenna polarization type; a beam scanning algorithm; and a cell type. The decoding may comprise polar decoding.

In particular embodiments, a number of CRC bits used for a single beam sweep is represented by $L_{crc0}$, and the selected CRC length is $L_{crc0}+\log_2(L_{test})$. For example, $L_{crc0}$ may be 16, $L_{test}$ may be 4, and the selected CRC length may be 18.

$L_{crc0}$ may be 16, $L_{test}$ may be 8, and the selected CRC length may be 19. $L_{crc0}$ may be 16, $L_{test}$ may be 64, and the selected CRC length may be 22.

In particular embodiments, the wireless receiver comprises a wireless device.

According to some embodiments, a wireless receiver is capable of adaptive CRC length selection. The wireless receiver comprises processing circuitry operable to: receive encoded bits from a wireless transmitter; determine a number of hypothesis testings, $L_{test}$, for hypothesis-testing-based decoding of the received encoded bits; select a length of CRC based on the number of hypothesis testings; select a CRC polynomial of the selected length; perform hypothesis-testing-based decoding using the selected CRC polynomial and the selected length; and determine the best hypothesis that passes the CRC based on a path metric from the decoding.

In particular embodiments, the processing circuitry determines the number of hypothesis testings by obtaining a system parameter related to a number of beam sweeps that the wireless transmitter uses to transmit a wireless signal.

According to some embodiments, a wireless transmitter is capable of adaptive CRC length selection. The wireless transmitter comprises an obtaining module, a CRC module, an encoding module, and a transmitting module. The obtaining module is operable to obtain a system parameter related to a number of beam sweeps, $L_{test}$, used by the wireless transmitter for transmitting a wireless signal. The CRC module is operable to: select a CRC length based on the obtained system parameter; select a CRC polynomial of the selected length; generate CRC bits from time-dependent or time-independent information bits using the selected CRC polynomial; and concatenate the generated CRC bits with the time-dependent or time-independent information bits. The encoding module is operable to encode the concatenated bits. The transmitting module is operable to transmit the encoded bits to a wireless receiver.

According to some embodiments, a wireless receiver is capable of adaptive CRC length selection. The wireless receiver comprises a CRC module, a decoding module, and a receiving module. The receiving module is operable to receive encoded bits from a wireless transmitter. The CRC module is operable to: determine a number of hypothesis testings, $L_{test}$, for hypothesis-testing-based decoding of the received encoded bits; select a length of CRC based on the number of hypothesis testings; and select a CRC polynomial of the selected length. The decoding module is operable to: perform hypothesis-testing-based decoding using the selected CRC polynomial and the selected length; and determine the best hypothesis that passes the CRC based on a path metric from the decoding.

Also disclosed is a computer program product. The computer program product comprises instructions stored on non-transient computer-readable media which, when executed by a processor, perform the steps of: obtaining a system parameter related to a number of beam sweeps, $L_{test}$, used by the wireless transmitter for transmitting a wireless signal; selecting a CRC length based on the obtained system parameter; selecting a CRC polynomial of the selected length; generating CRC bits from time-dependent or time-independent information bits using the selected CRC polynomial; concatenating the generated CRC bits with the time-dependent or time-independent information bits; encoding the concatenated bits; and transmitting the encoded bits to a wireless receiver.

Another computer program product comprises instructions stored on non-transient computer-readable media which, when executed by a processor, perform the steps of: receiving encoded bits from a wireless transmitter; determining a number of hypothesis testings, $L_{test}$, for hypothesis-testing-based decoding of the received encoded bits; selecting a length of CRC based on the number of hypothesis testings; selecting a CRC polynomial of the selected length; performing hypothesis-testing-based decoding using the selected CRC polynomial and the selected length; and determining the best hypothesis that passes the CRC based on a path metric from the decoding.

Particular embodiments may exhibit some of the following technical advantages. For example, a particular advantage facilitates low-complexity hypothesis-testing-type decoding methods for the time index at the receiver without increasing the false alarm rate (FAR) or over-dimensioning the length of the CRC. The low-complexity decoding methods use the CRC to check each hypothesis, possibly in parallel, to reduce latency.

The use of low-complexity and low-latency decoding for broadcast channels is important for prolonging the battery life of mobile devices because typically a large number of decoding needs to be performed for different time-frequency-location hypotheses during initial network access of the UE whenever the UE wakes up, changes cell attachment, or re-synchronizes with the network. Other technical advantages will be readily apparent to one skilled in the art from the following figures, description and example embodiments.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Fifth generation (5G) New Radio (NR) communication systems can operate with carrier frequencies ranging from hundreds of MHz to hundreds of GHz. To broadcast system information to user equipment (UE) over the intended coverage area, beamforming is typically used to achieve power gain to compensate for path loss in the high frequencies. Because the signal coverage of each beam can be quite narrow when many antennas are used to form the beam, the system information is broadcast or transmitted at a different beam direction one at a time (i.e., beam sweeping).

Because typically only one of the many beams carrying the same system information can reach a particular receiver with good signal strength, the receiver does not know the location of the received beam in the overall radio frame structure. To enable the receiver to determine the start and the end of a periodic radio frame, a time index is often included when broadcasting the system information through beam sweeping.

The correct decoding of the time-index is important in determining the radio frame boundaries. Thus, it is important to protect the time-index, possibly along with other system information, with a cyclic redundancy check (CRC) code of a predefined length to detect incorrect decoding of the time index.

Polar codes are used as the channel coding scheme for control channels in 5G NR and may be the channel coding scheme for NR physical broadcast channel (NR-PBCH) to broadcast system information from a base station to a UE.

A particular problem is that NR communication systems can operate with carrier frequencies over a wide range. As the carrier frequency increases, however, the path loss also increases. To close the link budget, beamforming with a large antenna array may be used. Each beam sweep carries a unique time-index for the receiver to determine the radio frame boundaries. Receivers should be able to correctly decode the time index efficiently.

In many methods of carrying the time index in each beam sweep, the time index can only be detected efficiently with the help of a CRC. The most efficient way of decoding the time index for these methods of transmission is to hypothesize each possible value of the time index, decode the data assuming the hypothesized value is correct, and then check the CRC to see if any potential error is detected. Because the number of possible values of the time index is no less than the number of beam sweeps, a large number of CRC checks must be performed over each received block. As a result, the false detection rate or false alarm rate (FAR) increases.

Particular embodiments obviate the problems described above and include a transmitter that adaptively selects the length of CRC based on a number of beam sweeps, which may in turn be determined by certain system parameters, such as the operating carrier frequency. A CRC polynomial of the selected length is used to generate CRC bits for the data and time index. The selection may be implemented by a table-look-up or a direct calculation of the CRC length based on the number of expected hypothesis of time-index values, which is a function of the number of beam sweeps.

Particular embodiments facilitate low-complexity hypothesis-testing-type decoding methods for the time index at the receiver without increasing the FAR or over-dimensioning the length of the CRC. These low-complexity decoding methods use the CRC to check each hypothesis, possibly in parallel, to reduce latency. The use of low-complexity and low-latency decoding for broadcast channels is important for prolonging the battery life of mobile devices because typically a large number of decoding needs to be performed for different time-frequency-location hypotheses during initial network access of the UE whenever the UE wakes up, changes cell attachment, or re-synchronizes with the network.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 4-9B of the drawings, like numerals being used for like and corresponding parts of the various drawings. LTE and NR are used throughout this disclosure as an example cellular system, but the ideas presented herein may apply to other wireless communication systems as well.

Figure 4:
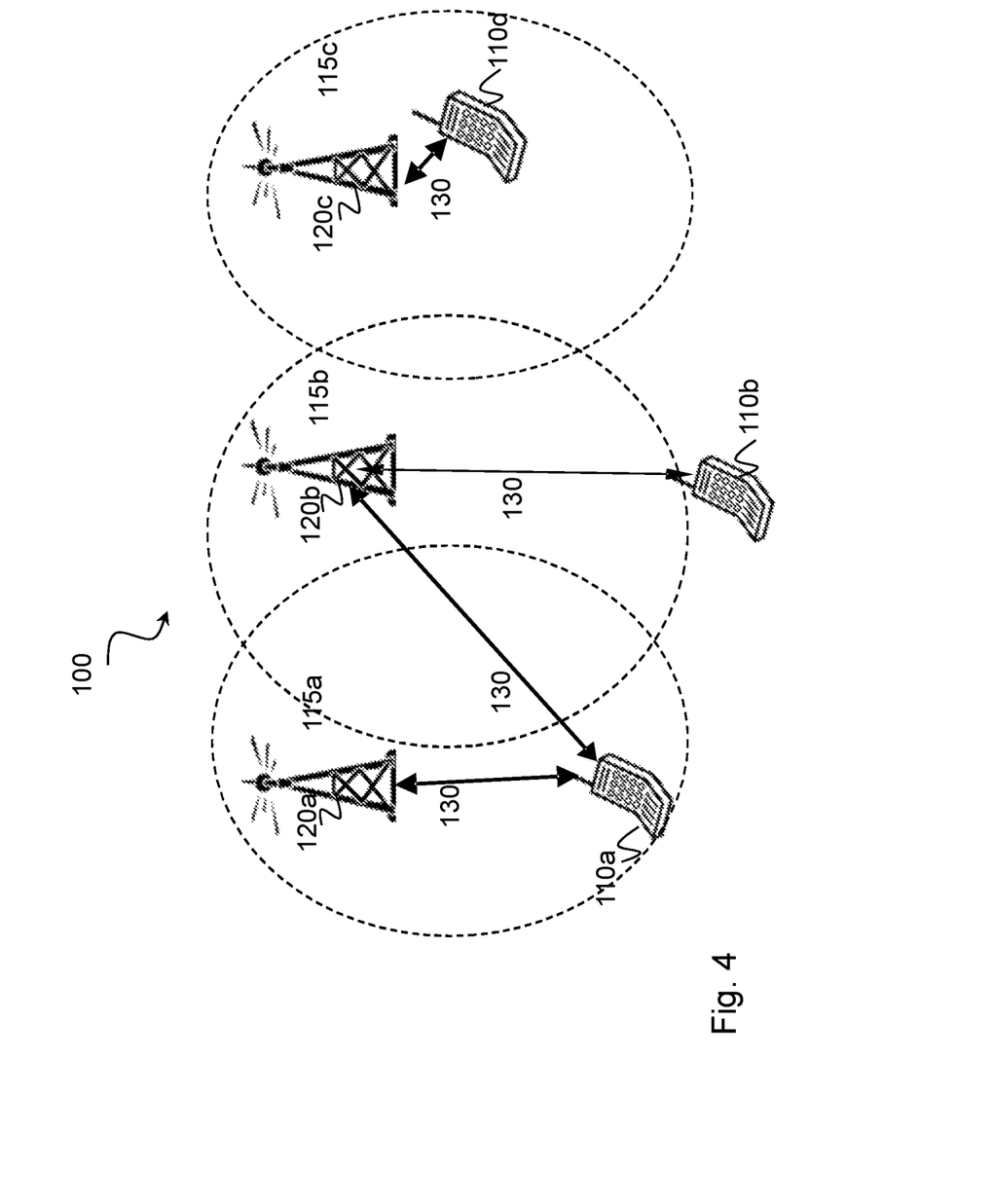
FIG. 4 is a block diagram illustrating an example wireless network, according to some embodiments.

FIG. 4 is a block diagram illustrating an example wireless network, according to a particular embodiment. Wireless network 100 includes one or more wireless devices 110 (such as mobile phones, smart phones, laptop computers, tablet computers, MTC devices, V2X devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals (e.g., synchronization signals (SS), etc.).

A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter or multiple transmitters for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

Wireless device 110, network node 120, or any other component of network 100 that transmits wireless signals may be referred to as a wireless transmitter. Wireless device 110, network node 120, or any other component of network 100 that receives wireless signals may be referred to as a wireless receiver.

In particular embodiments, wireless device 110 and network node 120 may encode and decode wireless signals 130 using polar coding. Network node 120 may transmit wireless signals 130 using beam sweeping.

According to some embodiments, network node 120 may obtain a system parameter related to a number of beam sweeps used for transmitting a wireless signal to wireless device 110. The obtained system parameter may include: a carrier frequency; a number of transmit antenna elements; a number of receive antenna elements; a transmitter antenna azimuth configuration; a transmitter antenna elevation configuration; an antenna polarization type; a beam scanning algorithm; and a cell type.

Network node 120 may select a CRC length based on the obtained system parameter and select a CRC polynomial of the selected length. Network node 120 may generate CRC bits from time-dependent or time-independent information bits (e.g., system information) using the selected CRC polynomial and concatenate the generated CRC bits with the time-dependent or time-independent information bits. Network node 120 may encode (e.g., polar encoding) the concatenated bits and transmit them to wireless device 110.

On the receiving side, wireless device 110 may receive encoded bits from network node 120. Wireless device 110 may determine a number of hypothesis testings, for hypothesis-testing-based decoding of the received encoded bits. In particular embodiments, wireless device 110 determines the number of hypothesis testings by obtaining a system parameter related to a number of beam sweeps that the wireless transmitter uses to transmit a wireless signal.

Wireless device 110 may select a length of CRC based on the number of hypothesis testings and select a CRC polynomial of the selected length. Wireless device 110 may perform hypothesis-testing-based decoding using the selected CRC polynomial and the selected length and determine the best hypothesis that passes the CRC based on a path metric from the decoding.

Figure 5:
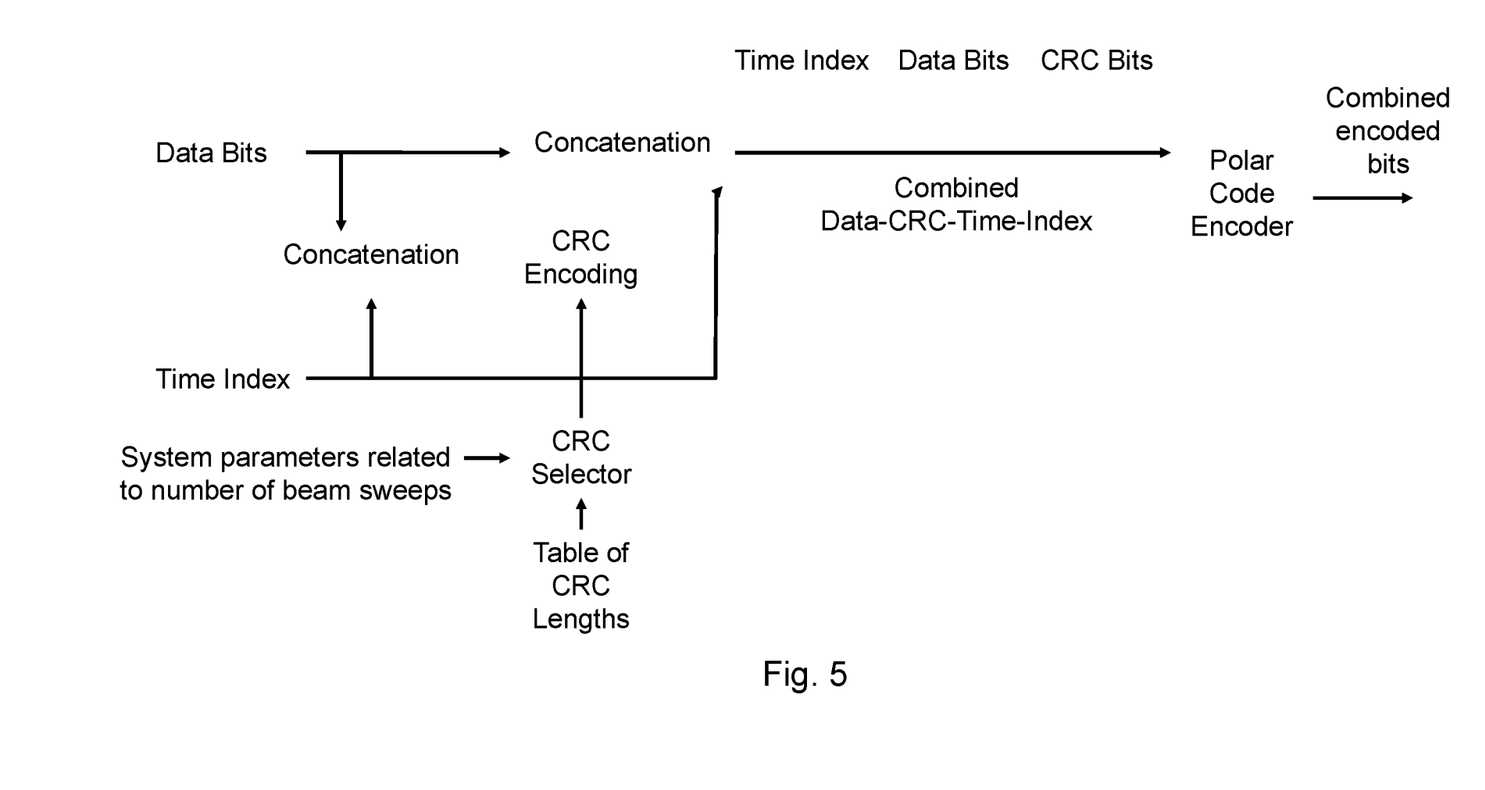
FIG. 5 is a block diagram of adaptive selection of CRC length, according to some embodiments.
Figure 6:
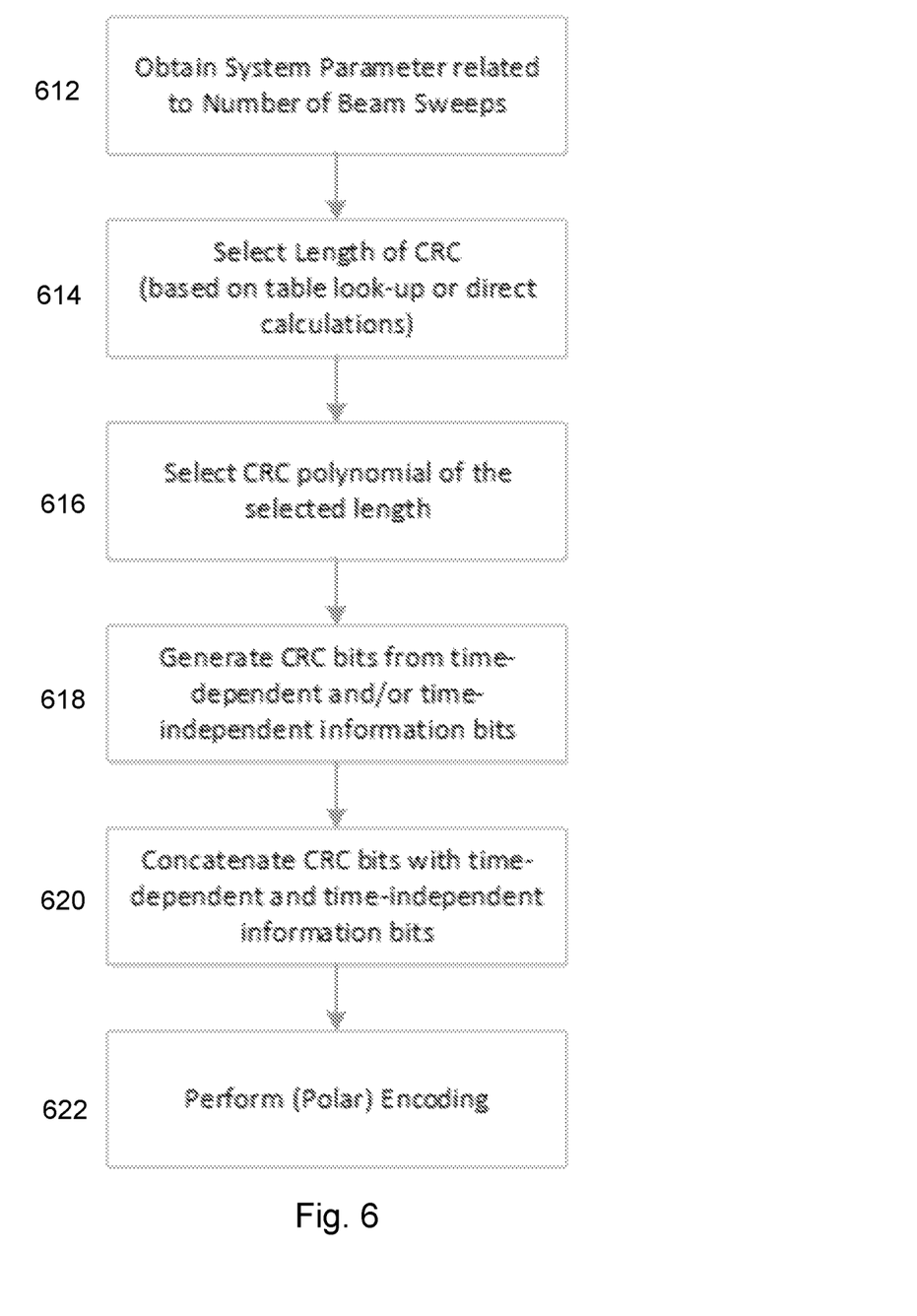
FIG. 6 is a block diagram of adaptive CRC length selection for use in a wireless transmitter, according to some embodiments.
Figure 7:
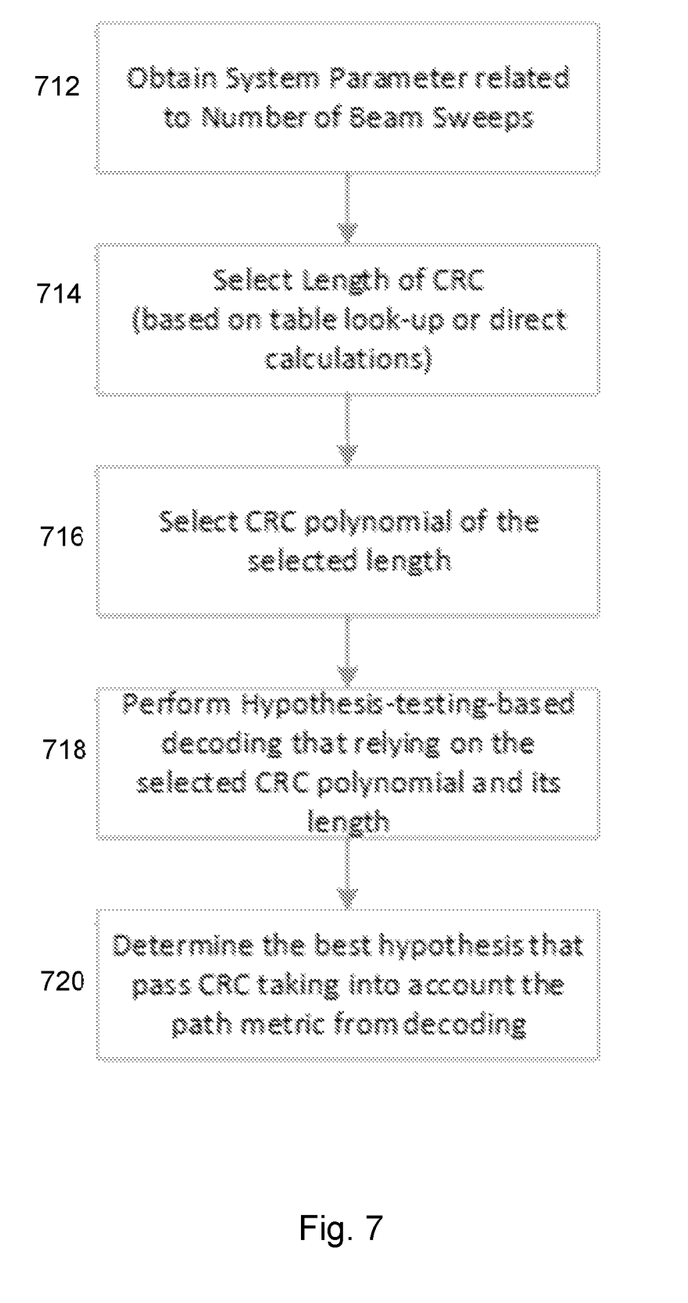
FIG. 7 is a block diagram of adaptive CRC length selection for use in a wireless receiver, according to some embodiments.

In particular embodiments, wireless device 110 and network node 120 may encode and decode wireless signals 130 according to any of the examples and embodiments described herein, such as those described with respect to FIGS. 5-7.

In wireless network 100, each network node 120 may use any suitable radio access technology, such as long term evolution (LTE), 5G NR, LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 8A below. Similarly, a network node may include any suitable combination of hardware and/or software. For example, in particular embodiments, a network node, such as network node 120, may include the components described with respect to FIG. 9A below.

The 5G-NR standard includes the following agreements. The maximum number of SS-blocks, L, within a SS burst set for different frequency ranges are as follows: (a) for frequency range up to 3 GHz, the maximum number of SS-blocks, L, within SS burst set is [1, 2, 4]; (b) for frequency range from 3 GHz to 6 GHz, the maximum number of SS-blocks, L, within SS burst set is [4, 8]; and (c) for frequency range from 6 GHz to 52.6 GHz, the maximum number of SS-blocks, L, within SS burst set is [64].

In one variation of SS block transmission, each of the L SS blocks is associated with one beamforming direction, for a total of L beams in the beam sweeping. Beam sweeping is particularly important for high frequency range, where the gNB (i.e., base station) relies on beamforming to combat the increased path loss.

The maximum number of SS blocks L within the SS burst set directly affects the number of hypothesis testings in decoding NR-PBCH when the Time Index is carried by NR-PBCH. In a straightforward decoder implementation, the decoder performs L hypothesis testings, where each hypothesis is associated with a Time Index of the SS block within a SS burst set. Thus, if assuming the highest L in the NR agreement, then: (a) for frequency range up to 3 GHz, the maximum number of SS-blocks, L, within SS burst set is 4, and the decoder of NR-PBCH performs 4 hypothesis testings; (b) for frequency range from 3 GHz to 6 GHz, the maximum number of SS-blocks, L, within SS burst set is 8, and the decoder of NR-PBCH performs 8 hypothesis testings; and (c) for frequency range from 6 GHz to 52.6 GHz, the maximum number of SS-blocks, L, within SS burst set is 64, and the decoder of NR-PBCH performs 64 hypothesis testings.

Thus, the number of hypothesis testings in the decoder is a function of operating frequency range. If each SS block is associated with a different beam direction, then the number of hypothesis testings in the decoder is a function of number of beams in beam sweeping.

The number of hypothesis testings affects the decoder performance. If the NR-PBCH CRC bits are used in the hypothesis testing to pick the most likely hypothesis, then in particular embodiments the CRC length varies as a function of the number of hypothesis testings. That is, the larger the number of hypothesis testings that rely on CRC checking, the more CRC bits are required. Specifically, if $L_{test}$ testings are performed using CRC checking, then particular embodiments increase the CRC length by $\log_2(L_{test})$, as compared to the CRC length $L_{crc0}$ when hypothesis testing is not considered.

For the NR PBCH, without hypothesis testing, $L_{crc0}$=16 bits. For the above listed SS block configuration, then the CRC length is modified as follows: (a) for frequency range up to 3 GHz, the decoder of NR-PBCH performs $L_{test}$=4 hypothesis testings, thus particular embodiments select the CRC polynomial to provide CRC length=$L_{crc0}$+2=16+2=18 bits; (b) for frequency range from 3 GHz to 6 GHz, the decoder of NR-PBCH performs 8 hypothesis testings, thus particular embodiments select the CRC polynomial to provide CRC length=$L_{crc0}$+3=16+3=19 bits; and (c) for frequency range from 6 GHz to 52.6 GHz, the decoder of NR-PBCH performs 64 hypothesis testings, thus particular embodiments select the CRC polynomial to provide CRC length=$L_{crc0}$+6=16+6=22 bits.

The previous example assumes that $L_{test}$ is equal to L (i.e., number of SS block in a SS burst). In some embodiments of a NR-PBCH decoder, the number of hypothesis testings relying on CRC are reduced, i.e., $L_{test} < L$.

In a particular embodiment, the CRC-relying hypothesis testings are reduced by using the path metric to select the most likely (or more likely) hypothesis. However, this increases the decoding complexity and latency. In the extreme, when the number of hypothesis testings reduces to one (i.e., picking the best hypothesis based solely on the relative path metrics from different hypothesis), $\log_2(L_{test}) = 0$, and the length of CRC is not increased.

FIG. 5 is a block diagram of adaptive selection of CRC length, according to some embodiments. The illustrated example shows that both the data and the time-index are used to generate a CRC code of a length determined by a CRC selector, which selects the CRC length by looking up the proper entry in a table or by direct calculation (such as adding $\log_2(L_{test})$ into the desired minimum CRC length designed for error detection only) based on the number of beam sweeps, which may in turn be determined by certain system parameter such as the carrier frequency of the radio signal.

A CRC is computed based on the selected length from the concatenation of time-index and data bits that carry system information. The data, time-index, and CRC are concatenated into a single block of information bits and fed into a polar encoder.

Examples of system parameters that may be used to determine the number of beam sweeps, which in turns can be used to determine the required length of CRC, may include the following: (a) carrier frequency; (b) number of transmit antenna elements; (c) number of receive antenna elements; (d) transmitter antenna configuration (azimuth only or azimuth plus elevation); (e) antenna type (e.g., polarized or non-polarized); (f) Beam Scanning Algorithm (Linear sweeping, Random sweeping, or Tree sweeping); (g) deployment scenarios (macro, micro, pico, femto cells); etc.

In some embodiments, the system parameters are transmitted by the network to the UE before the UE attempts to access the periodically transmitted broadcast information. For example, the number of beam sweeps may be communicated along with a synchronization signal (PSS/SSS) transmitted for initial time and frequency synchronization.

In some embodiments, the UE is already aware of the number of beam sweeps before accessing broadcast information. For example, for the receiver to receive the signal, the receiver may already know the carrier frequency, which may then be used to determine, possibly through look-up of a predefined table, the necessary length of CRC.

In some embodiments, the number of beam sweeps may be blindly detected without any a priori knowledge of system parameter from a predetermined set of possible numbers of beam sweeps.

The examples described above may be generally represented by the flowcharts in FIG. 6 (with respect to a transmitter, such as network node 120) and FIG. 7 (with respect to a receiver, such as wireless device 110). In these examples, the system information serves as the exemplified time-independent information, while the time-index serves as the time-dependent information.

FIG. 6 is a block diagram of adaptive CRC length selection for use in a wireless transmitter, according to some embodiments. In particular embodiments, one or more steps of FIG. 6 may be performed by network elements (e.g., network node 120, wireless device 110, etc.) of network 100 described with respect to FIG. 4.

The method begins at step 612, where the wireless transmitter obtains a system parameter related to a number of beam sweeps the wireless transmitter uses to transmit a wireless signal. For example, network node 120 may determine, based on its frequency range that network node 120 will use 8 beam sweeps.

In particular embodiments, the wireless transmitter may obtain a system parameter according to any of the examples described above. For example, the obtained system parameter may comprise at least one of a carrier frequency; a number of transmit antenna elements; a number of receive antenna elements; a transmitter antenna azimuth configuration; a transmitter antenna elevation configuration; an antenna polarization type (e.g., polarized or non-polarized); a beam scanning algorithm (e.g., Linear sweeping, Random sweeping, or Tree sweeping); and a cell type (e.g., macro, micro, pico, femto cells).

At step 614, the wireless transmitter selects a length of CRC (e.g., based on table lookup or direct calculations). For example, network node 120 may perform a table lookup based on 8 beam sweeps to determine the corresponding CRC length.

In particular embodiments, a number of CRC bits used for a single beam sweep is represented by $L_{crc0}$, and the selected CRC length is $L_{crc0} + \log_2(L_{test})$. For example, $L_{crc0}$ may be 16, Lest may be 4, and the selected CRC length may be 18. $L_{crc0}$ may be 16, Lest may be 8, and the selected CRC length may be 19. $L_{crc0}$ may be 16, $L_{test}$ may be 64, and the selected CRC length may be 22.

At step 616, the wireless transmitter selects a CRC polynomial of the selected length. For example, network node 120 selects a CRC polynomial according to the length determined in the previous step.

At step 618, the wireless transmitter generates CRC bits from time-dependent and/or time independent information bits. For example, network node 120 may use the selected CRC polynomial to generate CRC bits for a time index (i.e., time-dependent) and/or user data information bits (i.e., time-independent).

At step 620, the wireless transmitter concatenates CRC bits with time-dependent and time-independent information bits. For example, network node 120 may concatenate the CRC bits from the previous step with the time index and/or user data information bits.

At step 622, the wireless device performs polar encoding of the concatenated bits. For example, network node 120 may perform polar encoding of the concatenated bits from the previous step.

Modifications, additions, or omissions may be made to method of FIG. 6. Additionally, one or more steps in the method of FIG. 6 may be performed in parallel or in any suitable order. The steps may be repeated over time as necessary.

FIG. 7 is a block diagram of adaptive CRC length selection for use in a wireless receiver, according to some embodiments. In particular embodiments, one or more steps of FIG. 7 may be performed by network elements (e.g., network node 120, wireless device 110, etc.) of network 100 described with respect to FIG. 4.

The method begins with the wireless receiver receiving encoded bits from a wireless transmitter, such as the wireless transmitter described with respect to FIG. 6.

At step 712, the wireless receiver determines a number of hypothesis testings for hypothesis-testing-based decoding of the received encoded bits. In some embodiments, the wireless receiver obtains a system parameter related to a number of beam sweeps that a wireless transmitter uses to transmit a wireless signal. For example, wireless device 110 may determine that network node 120 will use 8 beam sweeps.

In particular embodiments, the wireless receiver may obtain a system parameter according to any of the examples described above. For example, the obtained system parameter may comprise at least one of a carrier frequency; a number of transmit antenna elements; a number of receive antenna elements; a transmitter antenna azimuth configuration; a transmitter antenna elevation configuration; an antenna polarization type (e.g., polarized or non-polarized); a beam scanning algorithm (e.g., Linear sweeping, Random sweeping, or Tree sweeping); and a cell type (e.g., macro, micro, pico, femto cells).

At step 714, the wireless receiver selects a length of CRC (e.g., based on table lookup or direct calculations). For example, wireless device 110 may perform a table lookup based on 8 beam sweeps to determine the corresponding CRC length.

In particular embodiments, a number of CRC bits used for a single beam sweep is represented by $L_{crc0}$, and the selected CRC length is $L_{crc0}+\log_2(L_{test})$. For example, $L_{crc0}$ may be 16, Lest may be 4, and the selected CRC length may be 18. $L_{crc0}$ may be 16, Lest may be 8, and the selected CRC length may be 19. $L_{crc0}$ may be 16, $L_{test}$ may be 64, and the selected CRC length may be 22.

At step 716, the wireless receiver selects a CRC polynomial of the selected length. For example, wireless device 110 selects a CRC polynomial according to the length determined in the previous step.

At step 718, the wireless receiver performs hypothesis-testing-based decoding that uses the selected CRC polynomial and its length. For example, wireless device 110 may perform hypothesis-testing-based decoding on a time index using the selected CRC polynomial and its length.

At step 720, the wireless receiver determines the best hypothesis that passes the CRC taking into account the path metric from decoding. For example, wireless device 110 may pick the best hypothesis out of 8 based on the results of the CRC.

Modifications, additions, or omissions may be made to method of FIG. 7. Additionally, one or more steps in the method of FIG. 7 may be performed in parallel or in any suitable order. The steps may be repeated over time as necessary.

Figure 8A:
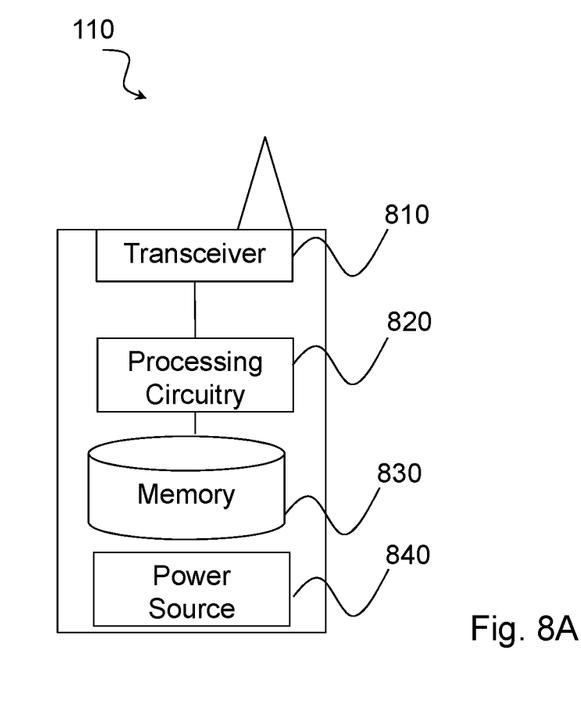
FIG. 8A is a block diagram illustrating an example embodiment of a wireless device.

FIG. 8A is a block diagram illustrating an example embodiment of a wireless device. The wireless device is an example of the wireless devices 110 illustrated in FIG. 4. In particular embodiments, the wireless device is capable of adaptively selecting a CRC based on a system parameter and performing hypothesis-testing-based decoding on time-dependent and time-independent information bits efficiently using the selected CRC.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 810, processing circuitry 820, memory 830, and power source 840. In some embodiments, transceiver 810 facilitates transmitting wireless signals to and receiving wireless signals from wireless network node 120 (e.g., via an antenna), processing circuitry 820 executes instructions to provide some or all of the functionality described herein as provided by the wireless device, and memory 830 stores the instructions executed by processing circuitry 820. Power source 840 supplies electrical power to one or more of the components of wireless device 110, such as transceiver 810, processing circuitry 820, and/or memory 830.

Processing circuitry 820 includes any suitable combination of hardware and software implemented in one or more integrated circuits or modules to execute instructions and manipulate data to perform some or all of the described functions of the wireless device. In some embodiments, processing circuitry 820 may include, for example, one or more computers, one more programmable logic devices, one or more central processing units (CPUs), one or more microprocessors, one or more applications, and/or other logic, and/or any suitable combination of the preceding. Processing circuitry 820 may include analog and/or digital circuitry configured to perform some or all of the described functions of wireless device 110. For example, processing circuitry 820 may include resistors, capacitors, inductors, transistors, diodes, and/or any other suitable circuit components.

Memory 830 is generally operable to store computer executable code and data. Examples of memory 830 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 840 is generally operable to supply electrical power to the components of wireless device 110. Power source 840 may include any suitable type of battery, such as lithium-ion, lithium-air, lithium polymer, nickel cadmium, nickel metal hydride, or any other suitable type of battery for supplying power to a wireless device.

Other embodiments of the wireless device may include additional components (beyond those shown in FIG. 8A) responsible for providing certain aspects of the wireless device's functionality, including any of the functionality described above and/or any additional functionality (including any functionality necessary to support the solution described above).

Figure 8B:
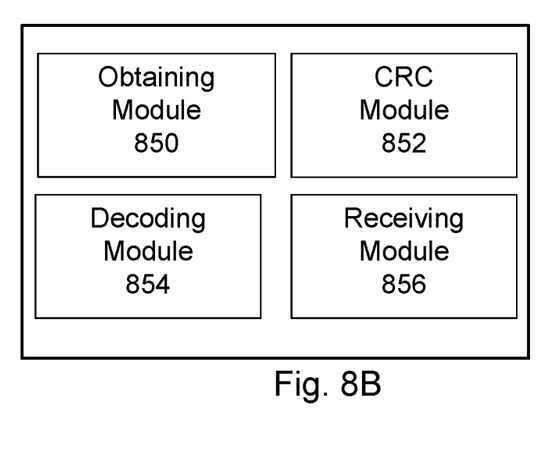
FIG. 8B is a block diagram illustrating example components of a wireless device.

FIG. 8B is a block diagram illustrating example components of a wireless device 110. The components may include obtaining module 850, CRC module 852, decoding module 854, and receiving module 856.

Receiving module 856 may perform the receiving functions of wireless device 110. For example, receiving module 856 may receive encoded bits from network node 120 according to any of the examples and embodiments described above. In certain embodiments, receiving module 856 may include or be included in processing circuitry 820. In particular embodiments, receiving module 856 may communicate with CRC module 852 decoding module 854 and obtaining module 850.

Obtaining module 850 may perform the obtaining functions of wireless device 110. For example, obtaining module 850 may obtain system parameters related to beam forming according to any of the examples and embodiments described above (e.g., step 612 of FIG. 6 or step 712 of FIG. 7). In certain embodiments, obtaining module 850 may include or be included in processing circuitry 820. In particular embodiments, obtaining module 1750 may communicate with CRC module 852, decoding module 854 and receiving module 856.

CRC module 852 may perform the CRC functions of wireless device 110. For example, CRC module 852 may adaptively determine a CRC length based on a system parameter related to beam sweeping according to any of the examples and embodiments described above (e.g., steps 614-620 of FIG. 6 or steps 712-716 of FIG. 7). In certain embodiments, CRC module 852 may include or be included in processing circuitry 820. In particular embodiments, CRC module 852 may communicate with obtaining module 850, decoding module 854 and receiving module 856.

Decoding module 854 may perform the decoding functions of wireless device 110. For example, decoding module 854 may perform hypothesis-testing-based decoding using a CRC according to any of the examples and embodiments described above (e.g., steps 718 and 720 of FIG. 7). In certain embodiments, decoding module 854 may include or be included in processing circuitry 820. In particular embodiments, decoding module 854 may communicate with obtaining module 850, CRC module 852 and receiving module 856.

Figure 9A:
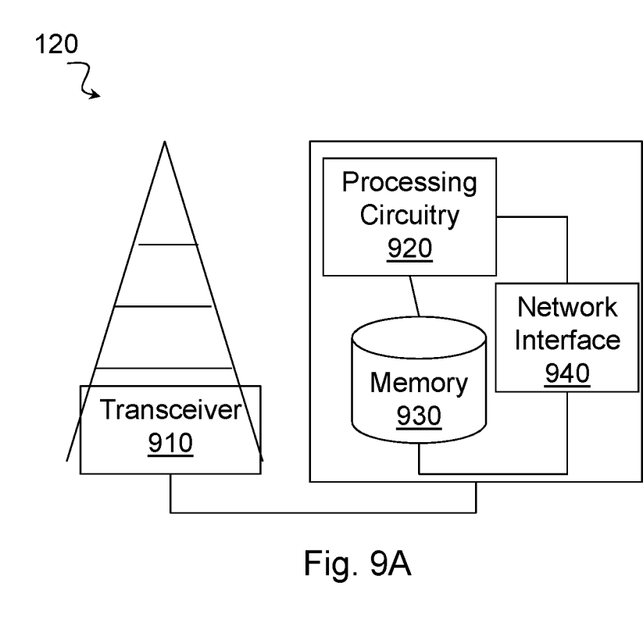
FIG. 9A is a block diagram illustrating an example embodiment of a network node.

FIG. 9A is a block diagram illustrating an example embodiment of a network node. The network node is an example of the network node 120 illustrated in FIG. 4. In particular embodiments, the network node is capable of adaptively selecting a CRC length for polar encoding time-independent and time dependent information.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 910, at least one processing circuitry 920, at least one memory 930, and at least one network interface 940. Transceiver 910 facilitates transmitting wireless signals to and receiving wireless signals from a wireless device, such as wireless devices 110 (e.g., via an antenna); processing circuitry 920 executes instructions to provide some or all of the functionality described above as being provided by a network node 120; memory 930 stores the instructions executed by processing circuitry 920; and network interface 940 communicates signals to backend network components, such as a gateway, switch, router, Internet, Public Switched Telephone Network (PSTN), controller, and/or other network nodes 120. Processing circuitry 920 and memory 930 can be of the same types as described with respect to processing circuitry 820 and memory 830 of FIG. 8A above.

In some embodiments, network interface 940 is communicatively coupled to processing circuitry 920 and refers to any suitable device operable to receive input for network node 120, send output from network node 120, perform suitable processing of the input or output or both, communicate to other devices, or any combination of the preceding. Network interface 940 includes appropriate hardware (e.g., port, modem, network interface card, etc.) and software, including protocol conversion and data processing capabilities, to communicate through a network.

Other embodiments of network node 120 include additional components (beyond those shown in FIG. 9A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

Figure 9B:
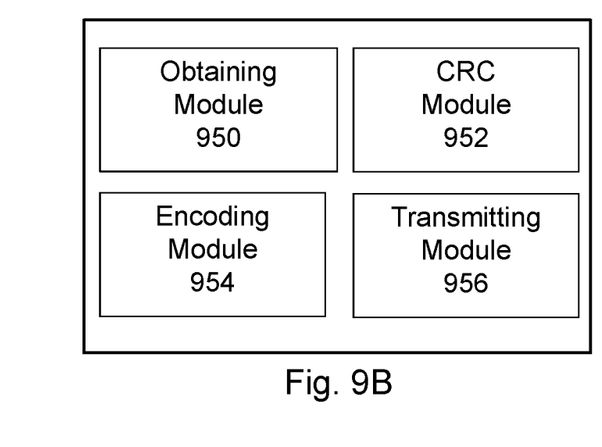
FIG. 9B is a block diagram illustrating example components of a network node.

FIG. 9B is a block diagram illustrating example components of network node 120. The components may include obtaining module 950, CRC module 952, encoding module 954, and transmitting module 956.

Obtaining module 950 may perform the obtaining functions of network node 120. For example, obtaining module 950 may obtain system parameters related to beam forming according to any of the examples and embodiments described above (e.g., step 612 of FIG. 6). In certain embodiments, obtaining module 950 may include or be included in processing circuitry 920. In particular embodiments, obtaining module 950 may communicate with CRC module 952, encoding module 954 and transmitting module 956.

CRC module 952 may perform the CRC functions of network node 120. For example, CRC module 952 may adaptively determine a CRC length based on a system parameter related to beam sweeping according to any of the examples and embodiments described above (e.g., steps 614-620 of FIG. 6). In certain embodiments, CRC module 952 may include or be included in processing circuitry 920. In particular embodiments, CRC module 952 may communicate with obtaining module 950, encoding module 954 and transmitting module 956.

Encoding module 954 may perform the encoding functions of network node 120. For example, encoding module 954 may perform polar encoding according to any of the examples and embodiments described above (e.g., step 622 of FIG. 6). In certain embodiments, encoding module 954 may include or be included in processing circuitry 920. In particular embodiments, encoding module 954 may communicate with obtaining module 950, CRC module 952 and transmitting module 956.

Transmitting module 956 may perform the transmitting functions of network node 120. For example, transmitting module 956 may transmit encoded information bits using beam sweeping according to any of the examples and embodiments described above. In certain embodiments, transmitting module 956 may include or be included in processing circuitry 920. In particular embodiments, transmitting module 956 may communicate with obtaining module 950, CRC module 952 and encoding module 954.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3D Three Dimensional
3GPP Third Generation Partnership Project
BTS Base Transceiver Station CRC Cyclic Redundancy Check.
D2D Device to Device
eNB eNodeB
FAR False Alarm Rate
FDD Frequency Division Duplex
IEEE Institute of Electrical and Electronic Engineers
LDPC Low-density Parity-Check
LLR Log Likelihood Ratio
LTE Long Term Evolution
MAC Medium Access Control
M2M Machine to Machine
MIMO Multi-Input Multi-Output
MTC Machine Type Communication
NR New Radio
PBCH Physical Broadcast Channel
PDSCH Physical Downlink Shared Channel
PUCCH Physical Uplink Control Channel
RAN Radio Access Network
RAT Radio Access Technology
RBS Radio Base Station
RNC Radio Network Controller
RRC Radio Resource Control
RRH Remote Radio Head
RRU Remote Radio Unit
SC Successive Cancellation
SCL Successive Cancellation List
SIB System Information Block
SINR Signal-to-Interference-plus-Noise Ratio
SSB Synchronization Signal Block
TDD Time Division Duplex
TTI Transmission Time Interval
UE User Equipment
UL Uplink
UTRAN Universal Terrestrial Radio Access Network
WAN Wireless Access Network

The invention claimed is:

1. A method for use in a wireless receiver of adaptive cyclic redundancy check (CRC) length selection, the method comprising:
receiving encoded bits from a wireless transmitter;
determining a number of hypothesis testings, $L_{test}$, for hypothesis-testing-based decoding of the received encoded bits;
selecting a length of CRC based on the number of hypothesis testings;
selecting a CRC polynomial of the selected length;
performing hypothesis-testing-based decoding using the selected CRC polynomial and the selected length; and
determining the best hypothesis that passes the CRC based on a path metric from the decoding.

2. The method of claim 1, wherein the wireless receiver comprises a wireless device.

3. A wireless receiver for adaptive cyclic redundancy check (CRC) length selection, the wireless receiver comprising processing circuitry to:
receive encoded bits from a wireless transmitter;
determine a number of hypothesis testings, Lest, for hypothesis-testing-based decoding of the received encoded bits;
select a length of CRC based on the number of hypothesis testings;
select a CRC polynomial of the selected length; perform hypothesis-testing-based decoding using the selected CRC polynomial and the selected length; and
determine the best hypothesis that passes the CRC based on a path metric from the decoding.

4. The wireless receiver of claim 3, wherein determining the number of hypothesis testings comprises obtaining a system parameter related to a number of beam sweeps that the wireless transmitter uses to transmit a wireless signal.

5. The wireless receiver of claim 4, wherein the obtained system parameter comprises at least one of:
a carrier frequency;
a number of transmit antenna elements;
a number of receive antenna elements;
a transmitter antenna azimuth configuration;
a transmitter antenna elevation configuration;
an antenna polarization type;
a beam scanning algorithm; and
a cell type.

6. The wireless receiver of claim 3, wherein the decoding comprises polar decoding.

7. The wireless receiver of claim 4, wherein a number of CRC bits used for a single beam sweep is represented by $L_{crc0}$, and the selected CRC length is $L_{crc0}+\log_2(L_{test})$.

8. The wireless receiver of claim 7, wherein $L_{crc0}$ is 16, $L_{test}$ is 4, and the selected CRC length is 18.

9. The wireless receiver of claim 7, wherein $L_{crc0}$ is 16, $L_{test}$ is 8, and the selected CRC length is 19.

10. The wireless receiver of claim 7, wherein $L_{crc0}$ is 16, $L_{test}$ is 64, and the selected CRC length is 22.

11. The wireless receiver of claim 3, wherein the wireless receiver comprises a wireless device.

* * * * *